US 6,707,392 B1

(12) United States Patent
Melton

(10) Patent No.: US 6,707,392 B1
(45) Date of Patent: Mar. 16, 2004

(54) VEHICLE SPEED CONTROL SYSTEM AND METHOD FOR CONTROLLING VEHICLE SPEED

(76) Inventor: Arnold Lee Melton, P.O. Box 804, Fletcher, NC (US) 28732

( * ) Notice: Subject to any disclaimer, the term of this patent is extended or adjusted under 35 U.S.C. 154(b) by 0 days.

(21) Appl. No.: 10/256,460

(22) Filed: Sep. 26, 2002

Related U.S. Application Data

(63) Continuation-in-part of application No. 09/298,430, filed on Jun. 17, 1999, now abandoned.

(51) Int. Cl.[7] .................................................. G08G 1/00
(52) U.S. Cl. ............................. 340/902; 701/2; 701/121
(58) Field of Search .................................. 340/933, 902, 340/903, 905, 928, 539.1, 539.13, 10.1, 10.3, 10.32, 10.33, 10.4, 10.41, 10.42, 10.5, 10.52, 825.69, 825.72, 825.52, 3.1, 3.5, 3.51, 3.52, 3.53, 3.54; 701/1, 2, 36, 121

(56) References Cited

U.S. PATENT DOCUMENTS

| 5,654,891 | A | * | 8/1997 | Naccache et al. ............ 701/119 |
| 5,847,661 | A | * | 12/1998 | Ricci .......................... 340/902 |
| 5,933,075 | A | * | 8/1999 | Ditson .................... 340/426.11 |
| 5,995,898 | A | * | 11/1999 | Tuttle .......................... 701/102 |
| 6,052,068 | A | * | 4/2000 | Price R-W et al. .......... 340/933 |
| 6,278,360 | B1 | * | 8/2001 | Yanagi ......................... 340/436 |
| 6,285,943 | B1 | * | 9/2001 | Boulter ......................... 701/93 |
| 6,388,579 | B1 | * | 5/2002 | Adcox et al. ................ 340/902 |

* cited by examiner

Primary Examiner—Nina Tong
(74) Attorney, Agent, or Firm—Heslin Rothenberg Farley & Mesiti P.C.; Victor A. Cardona, Esq.

(57) ABSTRACT

A system for controlling a speed of a vehicle is provided. The system includes a first communications unit and a second communications unit. The first communications unit is coupled to an engine controller for controlling an engine of a first vehicle. Also, the first communications unit includes a first sending unit for sending a first message to the engine controller. The second communications unit is located remotely from the first communications unit and includes a second sending unit for sending a second message to the first communications unit to cause the first communications unit to send the first message to control the speed of the first vehicle. A method for remotely controlling the speed of a vehicle is also included which includes sending a controlling message from a remote communications unit to a proximal communications unit coupled to an engine of a vehicle. The method further includes receiving a controlling message at the proximal communications unit and controlling a speed of the vehicle based on the message.

13 Claims, 3 Drawing Sheets

VEHICLE SPEED CONTROL MASTER REMOTE

VEHICLE SPEED CONTROL SYSTEM AND METHOD FOR CONTROLLING VEHICLE SPEED

CROSS-REFERENCE TO RELATED APPLICATIONS

This is a Continuation-In-Part of U.S. patent application Ser. No. 09/298,430, filed Jun. 17, 1999, now abandoned entitled Laser Electrical System Disabler, the disclosure of which is incorporated herein by reference

TECHNICAL FIELD

This invention relates, in general, to remote vehicle control systems and, in particular, to a remote vehicle speed control system usable for controlling a speed of a vehicle and a method for remotely controlling vehicle speed.

BACKGROUND ART

High speed vehicle chases by law enforcement officials and those eluding them are known to cause a great number of injuries and deaths each year. There are several methods for ending such chases including the use of rubber mats with spikes and police road blocks. Such methods contribute to casualties among the pursued, the pursuers, and those in their vicinity due to the uncontrolled nature of these methods. Specifically, the termination of high speed chases using these methods often lead to sudden or uncontrolled stopping of the fleeing vehicles. For example, the puncturing of tires of a fleeing vehicle using rubber mats with spikes could cause a driver of such a vehicle to lose control of the vehicle due to the damaged tires and to collide with another object, e.g., another car or a tree. Also, the installation of a road block may precipitate a fleeing car trying to run through or around any barricades set up. Such action could injure anyone in the path of the fleeing car as it attempts to pass through or drives around the road block.

Thus, a need exists for remotely slowing vehicles in a controlled manner from high speeds thereby enabling vehicles being pursued by law enforcement personnel to be safely brought to a stop.

SUMMARY OF THE INVENTION

The present invention provides, in a first aspect, a system for controlling a speed of a vehicle which includes a first communications unit and a second communications unit. The first communications unit is coupled to an engine controller for controlling an engine of a first vehicle. Also, the first communications unit includes a first sending unit for sending a first message to the engine controller. The second communications unit is located remotely from the first communications unit and includes a second sending unit for sending a second message to the first communications unit to cause the first communications unit to send the first message to control the speed of the first vehicle.

The present invention provides, in a second aspect, a method for remotely controlling a speed of a vehicle. The method includes sending a controlling message from a remote communications unit to a proximal communications unit coupled to an engine of a vehicle. The method further includes receiving the controlling message at the proximal communications unit and controlling a speed of the vehicle based on the message.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention will be apparent from the following detailed description of preferred embodiments taken in conjunction with the accompanying drawings in which:

DETAILED DESCRIPTION

In accordance with the principles of the present invention, methods and systems are provided for controlling a speed of a vehicle.

Figure 1:
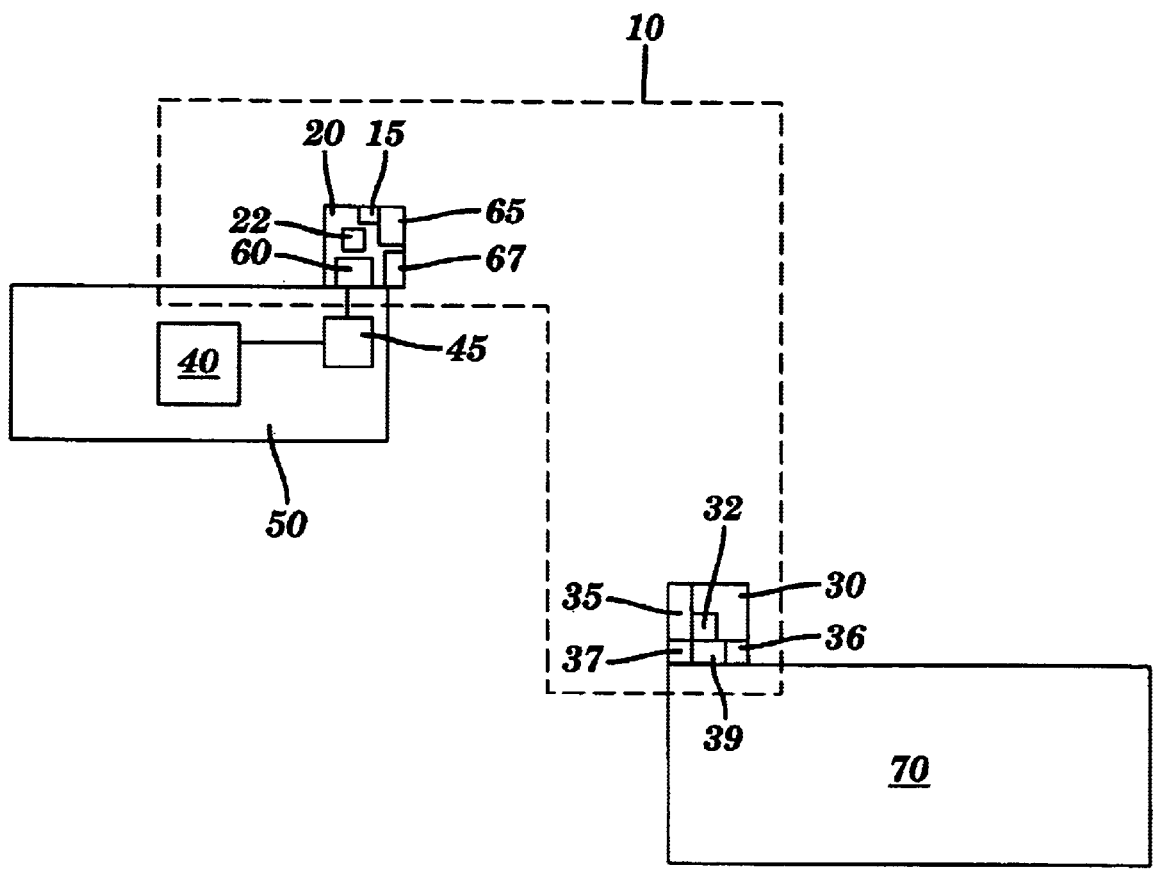
FIG. 1 is a block diagram of a system for controlling a speed of a vehicle.

In an exemplary embodiment depicted in FIG. 1, a system 10 for controlling a speed of a vehicle includes a first communications unit 20 and a second communications unit 30. First communications unit 20 is coupled to an engine controller 45 which controls an engine 40 of a first vehicle 50. Also, first communications unit 20 includes a first sending unit 60 for sending a message or instruction to engine controller 45. Second communications unit 30 is located remotely from first communications unit 20 and includes a second sending unit 35 for sending a second message to first communications unit 20.

Figure 2:
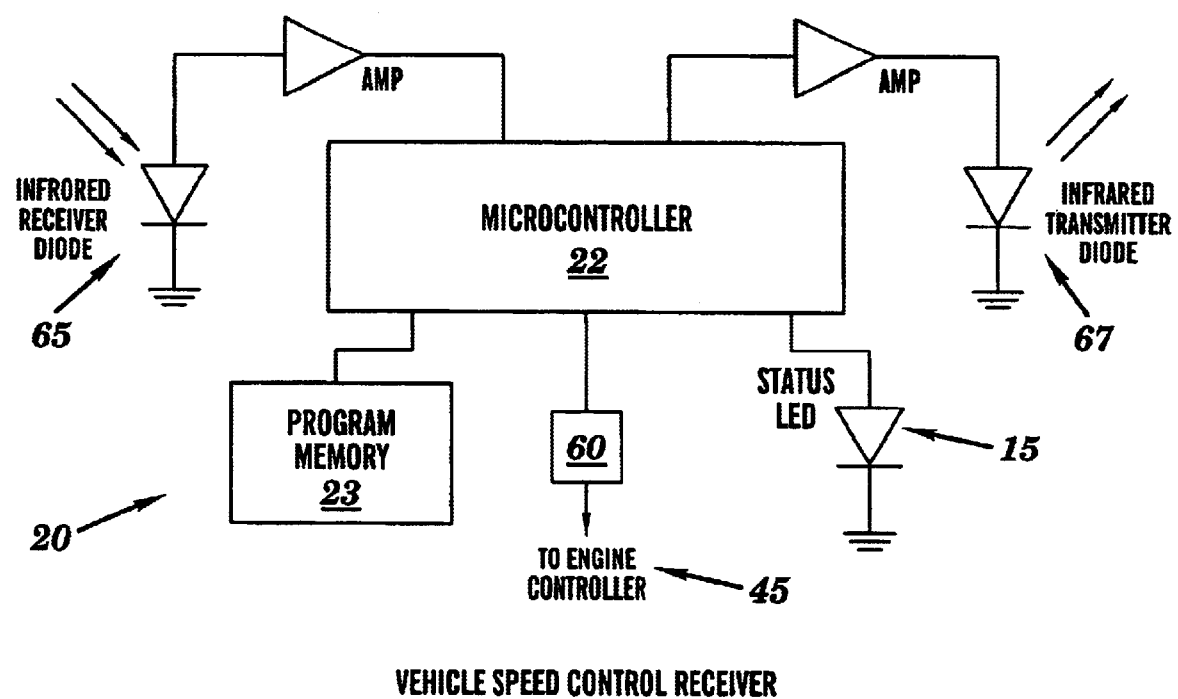
FIG. 2 is a block diagram of a first communications unit of the system for controlling a speed of a vehicle of FIG. 1.
Figure 3:
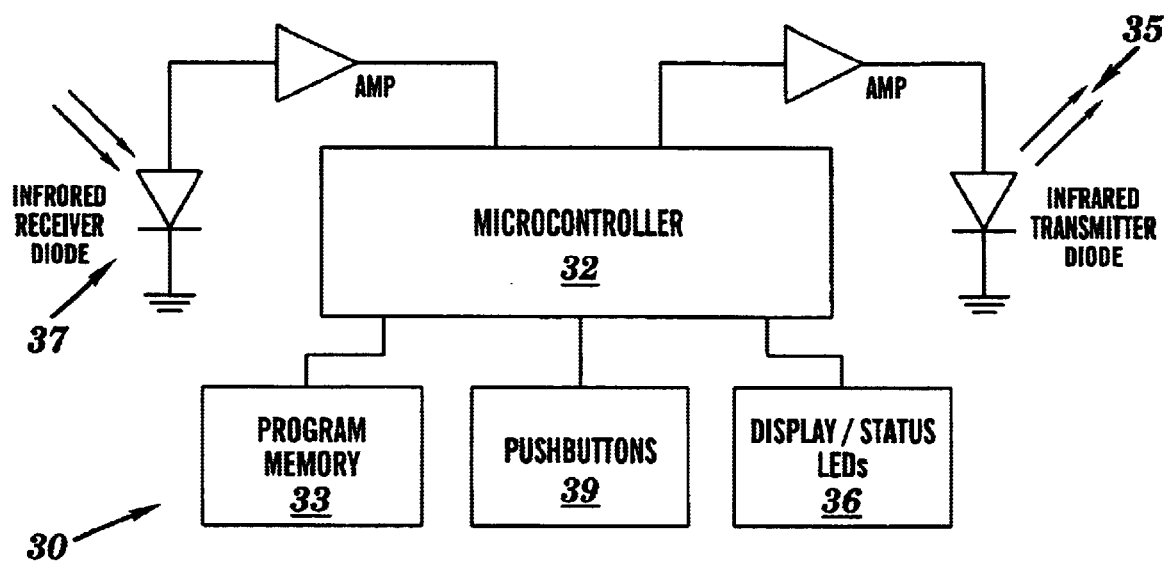
FIG. 3 is a block diagram of a second communications unit of the system for controlling a speed of a vehicle of FIG. 1.

As depicted in FIGS. 1–2, first communications unit 20 may include a third sending unit 67 usable for sending a message or data to second communications unit 30. For example, third sending unit 67 of first communications unit 20 may be a laser transmitter. Likewise, second sending unit 35 of second communications unit 30 may be a laser transmitter. Further, first communications unit 20 may include one or more central processing units, memory, one or more storage devices and one or more input/output devices, as is well known in the art. For example, first communications unit 20 may have a processor or controller 22, a status indicator 15 to enable visual output for viewing by a user, and a program memory storage device 23. Status indicator 15 may be a display, a light, a sound player, or other means of conveying information to a user. In another example, status indicator 15 could be any light, gage, dial, or other indicator present on the dash of the vehicle, such as a turning indicator light. Storage device 23 may be a memory microchip, hard drive, floppy disk, or other means of storing electronic data. Also, first communications 20 may include a first receiver 65, which may be a laser receiver.

First communications unit 20, or portion(s) thereof, may be mounted to an outside surface (not shown) or inside surface (not shown) of first vehicle 50 to allow first receiver 65 to receive a message transmitted from second sending unit 35. In one example, first receiver 65 or the entirety of first communications unit 20, may located at or near the location of a third (e.g., top) backup light in the rear window of first vehicle 50. Also, first receiver 65 may be configured to receive such a message from any direction, which may be advantageous when first vehicle 50 is located in traffic among other automobiles. Particularly, this ability allows second sending unit 35 to send a message to first receiver 65 from various directions. First sending unit 60 may be coupled to an engine controller 45 which controls engine 40 of first vehicle 50. First sending unit 60 may send messages or data to, and/or receive messages or data from, engine controller 45 via a standard connection 22, such as any type of wire connection or wireless connection.

In one example, first sending unit 60 may send a message to engine controller 45 instructing or commanding that a speed of first vehicle 50 be controlled. For example, engine controller 45 may control one or more systems of first vehicle 50 to gradually slow vehicle 50 to a stop or to prevent vehicle 50 from exceeding a certain speed by degrading the performance of engine 45, while allowing a driver to maintain control of first vehicle 50. Such slowing of first vehicle 50 might be caused by engine controller 45 electronically reducing the function of the vehicle's accelerator. Specifically, in one example, engine controller 45 might be coupled to a throttle position sensor which senses a position of the accelerator of a car and outputs a voltage to engine controller 45 to control a speed of first vehicle 50. In response to a command from first sending unit 60, engine controller 45 may substitute a desired speed or desired acceleration pattern for that which is actually sensed by the throttle position sensor. Alternatively, first sending unit 60 might be directly coupled to the throttle position sensor and might command the throttle position sensor to output a certain voltage to engine controller 45 to control a speed and/or an acceleration pattern for engine 40 and first vehicle 50. Also, in other examples, engine controller 45 may cause an ignition system of first vehicle 52 to gradually slow the vehicle or cause a supply of fuel to engine 40 to be gradually decreased by a fuel pump to cause the slowing of first vehicle 50. Further, engine controller 45 could electronically applying the brakes of the vehicle. As will be understood by those skilled in the art, engine controller 45 may slow first vehicle 50 in any number of additional ways. Also, it will be understood that engine controller 45 may include multiple controllers controlling various components of engine 40 separately or in an integrated manner.

Second communications unit 30 may be a hand-held unit or it may be mounted to a second vehicle 70, for example, a law enforcement vehicle such as a police vehicle. Also, second communications unit 30 may include a second receiver 37, e.g., a laser receiver. Further, second communications unit 30 may include one or more central processing units, memory, one or more storage devices and one or more input/output devices, as is well known in the art. For example, second communications unit 30 may have a second processor or controller 32, a status indicator 36 to enable visual output for viewing by a user, and a program memory storage device 33. Status indicator 36 could include any number of means of displaying information to a user, e.g., a visual display, a light, or a sound player. In another example, status indicator 36 could be any light, gage, dial, or other indicator present on the dash of the vehicle, such as a turning indicator light. Program memory storage device 33 could include any number of means for storing electronic data including a memory microchip, a hard drive, a floppy disk, or other such means as is known by those skilled in the art. Also, second communications unit 30 could include any number of input devices 39, e.g. a keyboard keypad, or trigger mechanism to allow a user to create and send messages or instructions to another communications unit, e.g. first communications unit 20. Such messages or instructions may also be sent by a user simply pulling a trigger mechanism of input device 39.

Second sending unit 35 may provide a signal (e.g., a laser signal) to transmit information or instructions such that the signal may be directed toward a particular vehicle and more particularly toward a receiver (e.g., first receiver 65) of a particular communications unit, e.g., first communications unit 20. The signal provided may be narrowly focused to enable it to be directed toward an individual vehicle in traffic. In one example, this signal may be sent between second sending unit 35 and first communications unit 20 at a distance of up to about fifty feet. Such signal may be an interrogation signal which initiates communication between second communications unit 30 and first communications unit 20, for example. The interrogation signal may provide a unique return address or code for second communications unit 30 without requesting substantial action by first communications unit 20. First communications unit 20 may respond to the interrogation signal using the unique return address of second communications unit 30 provided by the interrogation signal. Such response may further provide to second communications unit 30 an identification signal which is unique to first communications unit 20. This response signal from first communications unit 20 may also include information which is pertinent and/or unique to first vehicle 50 coupled to first communications unit 20. Such information could include operational specifications of first vehicle 50, first communications unit 20, engine 40, and/or engine controller 45, for example. The response signal may also be encrypted inhibit other receivers in the vicinity of first communications unit 20 and/or second communications unit 30 from intercepting the response signal. Further, any further signals between the communications units may be encrypted using the return address and the identification signal to avoid interception of such signals and/or such signals being directed to, and acted upon by, an unintended communications unit of an unintended vehicle.

When a secure and reliable data link has been established through receipt of the interrogation signal by first communications unit 20 and receipt of the response signal by second communications unit 30, command signals may be transmitted to first communications unit 20 from second communications unit 30. First communications unit 20 receives the command signals and then may decrypt any encrypted signals to determine the validity of the command and/or identification information. If an invalid command or identification information is detected, first communications unit 20 may reply to second communications unit 30 with a retransmit signal. If a valid command and identification signal is detected, first communications unit 20 executes the command, (e.g., to control the speed of vehicle 50) then transmits a confirmation signal to second communications unit 30 to signify the successful reception and execution of the command. Such successful reception and execution of the command may be indicated via a status indicator 15 and/or status indicator 36. Any number of command/acknowledgment transactions can be executed in this manner.

Also, in one example, an indication may be provided to alert the driver of first vehicle 50 that system 10 has been activated via status indicator 15. Further, the current level of engine performance may also be transmitted to the second communications unit 30 from first communications unit 20 as part of the communications command/acknowledgment transaction between first communications unit 20 and second communications unit 30. Further, any other information relating to first vehicle 50 may be transmitted to second communications unit 30 from first communications unit 20. Such information may be viewed on states indicator 36, for example.

One example of a method for controlling a speed of a vehicle is described as follows. A remote or following vehicle, e.g., a police vehicle, may have second communications unit 30 mounted thereto or a hand-held version thereof carried in such vehicle. A proximal or fleeing vehicle, e.g., first vehicle 50, may have first communications unit 20 mounted thereon and coupled to an engine controller, e.g., engine controller 45, for controlling and an engine thereof. Upon the police vehicle approaching the fleeing vehicle, the user of second communications unit 30, e.g., the police officer, may cause (e.g., via input device 39 such as a trigger mechanism or keypad) second communications unit 30 to send an interrogation signal (e.g., a digital bit stream) from a sending unit 35 via a laser or infrared transmission, for example. The interrogation signal may be received by first receiving unit 65 which may respond with a response signal, e.g., a laser or infrared transmission, which includes information relating to first communications unit 20, engine controller 45, and/or first vehicle 50. Upon receipt of the response signal at second communications unit 30, a display, e.g., status indicator 36, may indicate to the police officer that a secure communication has been achieved between second communications unit 30 and first communications unit 20 including, for example, encryption of the signals therebetween. The police officer may then manipulate input device 39 (e.g., via a trigger and/or keypad thereof) to cause second communications unit 30 to send a signal to first communications unit 20 instructing first communications unit 20 to control engine controller 45. Such instructions may include a command to cause engine controller 45 to gradually or incrementally slow first vehicle 50 through a disabling of an accelerator pedal of first vehicle 50 or other means for slowing the vehicle. Such deceleration is controlled such that a driver of first vehicle 50 may maintain control of the vehicle during its deceleration. Such controlled deceleration may reduce the risk of injury or death due to an uncontrolled or erratic deceleration. The incremental change in speed may be accomplished in steps, responding by decreasing engine performance by one step for each command transaction received by first communications unit 20 from second communications unit 30. Alternatively, an instruction from second communications unit 20 may start a timed interval during which the engine performance is gradually reduced automatically to a minimum performance level (e.g., stopped position of first vehicle 50).

It will be understood by those skilled in the art that first communication unit 20 and second communications unit 30 could comprise any number of communications units adapted to communicate with each other to cause a speed of one or more vehicles to be regulated at a distance from such vehicles. Also, it will be understood from the above description that transmission of communications signals (e.g., electronic signals) between communications units may occur through any of a variety of means including laser transmitters and receivers, radio signal transmitters and receivers, infrared transmitters and receivers, or any other means of communicating data or information at a distance currently in use or later developed. In one example, data may be transmitted in a digital bit stream between an infrared transmitter(s) and infrared receiver(s).

Also, it will be understood that the above described systems for controlling the speed of vehicles might be utilized for various vehicles including passenger or commercial cars and trucks, construction vehicles, construction equipment, lawn or garden equipment or tractors, recreational vehicles, or any other type of vehicle. Further, vehicles may have their performance degraded (i.e., the speed reduced) in a variety of ways due to information, messages, and/or data transmitted to them from the communications units. For example, in a vehicle without an engine controller, first communications unit 20 might be coupled to an electrical system or ignition system of such a vehicle to directly degrade performance of such system. In other example relating to a vehicle without an engine controller, first communications unit 20 may be coupled to a fuel pump of the vehicle and a fuel pump may be controlled by first communications unit 20 such that the amount of fuel to the engine was regulated to slow and/or stop the vehicle.

The above-described environment regarding first communications unit 20 and second communications unit 30 and system 10 for controlling a speed of a vehicle are only offered as examples. The present invention can be incorporated and used with many types of communications units, computers, processors, controllers, and/or environments without departing from the spirit of the present invention. For example, first sending unit 60, third sending unit 67, first processor 22 and first receiver 65 could perform some or all of the functions of each other. Also, second sending unit 35, second receiver 37, and second processor 32 could perform some or all of the functions of each other. Further, first communications unit 10 and engine controller 45 could perform some or all of the functions of each other and they could be integral to or separate from one another. Further, engine controller 45 and/or first communications unit 20 may be configured to control various operational aspects of a vehicle, for example, lighting systems, locking systems, environmental control systems, electrical systems, braking systems, fuel supply systems, and other means for controlling aspects of the vehicle, as will be understood by those skilled in the art.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A system for controlling a speed of a vehicle, said system comprising:

a first communications unit located in a first vehicle and coupled to an engine controller for controlling an engine of said first vehicle, said first communications unit comprising a first sending unit for sending a first message to said engine controller;

a second communications unit located in a second vehicle remote from said first vehicle;

said second communications unit comprising a second sending unit configured to send a second message to said first communications unit, said second message comprising an interrogation signal having a unique return address for said comminications unit;

said second sending unit comprising a second laser transmitter and said first communications unit comprising a first laser receiver, said second sending unit configured to selectively send said second message in response to an indication from a user, said second sending unit configured to selected among a plurality of vehicles to send said second message to said first communications unit in response to said indication from the user, and said second sending unit configured to send said second message during movement of said first vehicle and said second vehicle;

said first communications unit comprising a third sending unit having a first laser transmitter, said first communications unit configured to respond to said second message from said second communications unit via a third message, said third message providing an identification signal relating to said first communications unit to said second communications unit; and said second sending unit configured to send a fourth message to said first communications unit to cause said first communications unit to send said first message to cause said engine controller to control a speed of said first vehicle.

2. The system of claim 1 wherein said third sending unit comprises means for responding to said second communications unit by providing an encrypted message.

3. The system of claim 1 wherein said second sending unit comprises means for encrypting the second message.

4. The system of claim 1 wherein said second communications unit comprises a second receiver and wherein said second receiver comprises at least one of an infrared receiver and a laser receiver.

5. The system of claim 1 wherein said first communications unit is mounted to the first vehicle and said second communications unit is at least one of mounted to a second vehicle and carried in a second vehicle.

6. A method for remotely controlling a speed of a vehicle, the method comprising:

selecting a first vehicle among a plurality of vehicles by pointing a second laser transmitter of a remote communications unit in a second vehicle toward the first vehicle and selectively sending an interrogation signal by a user from the second laser transmitter to a first laser receiver of a proximal communications unit located in the first vehicle during movement of the first vehicle and the second vehicle, wherein the interrogation signal comprises a return address for the remote communications unit;

sending a responding signal from a first laser transmitter of the proximal communications unit to the remote communications unit in response to the interrogation signal, said responding signal comprising an identification signal relating to said proximal communications unit;

sending a controlling message from the second laser transmitter of the remote communications unit to a second laser receiver of the proximal communications unit; and receiving the controlling message at the proximal communications unit and controlling a speed of the vehicle based on the message.

7. The method of claim 6 further comprising encrypting the responding signal using the return address.

8. The method of claim 6, wherein the identification signal comprises information relating to the vehicle.

9. The method of claim 6 wherein the controlling message comprises the identification signal.

10. The method of claim 6 wherein the controlling message is encrypted using the identification signal.

11. The method of claim 6 wherein the controlling the speed comprises controlling the performance of the engine of the vehicle.

12. The method of claim 6 wherein the remote communications unit is located in a second vehicle.

13. The method of claim 6 further comprising sending an engine controlling message from the proximal communications unit to an engine controller for controlling the engine, in response to the controlling message.

* * * * *